United States Patent [19]
Tomkin

[11] 3,791,794
[45] Feb. 12, 1974

[54] INDICATOR MEANS IN FROZEN STATE UTILIZING pH-SENSITIVE INDICATOR AND SEPARATED ELECTROLYTE

[76] Inventor: Abraham Emil Tomkin, P.O. Box 7311, Washington, D.C. 20044

[22] Filed: Dec. 28, 1971

[21] Appl. No.: 212,982

[52] U.S. Cl. ......... 23/253 TP, 23/230 R, 23/253 R, 99/192 TT, 116/114 AM
[51] Int. Cl. ...................... G01n 21/06, G01n 33/02
[58] Field of Search .. 23/230, 253, 253 TP; 73/356; 99/192 TT; 116/114 AM

[56] References Cited
UNITED STATES PATENTS

| | | | |
|---|---|---|---|
| 2,614,430 | 10/1952 | Ballard et al. | 99/192 TT |
| 2,955,942 | 10/1962 | Fenity et al. | 99/192 TT |
| 3,002,385 | 10/1961 | Wahl et al. | 99/192 TT |
| 3,065,083 | 11/1962 | Gessler | 99/192 TT |
| 3,122,921 | 3/1964 | Koch | 99/192 TT UX |
| 3,336,212 | 8/1967 | Nicholas et al. | 99/192 TT |
| 3,545,400 | 12/1970 | Smith | 99/192 TT |
| 3,695,903 | 10/1972 | Telkes et al. | 99/192 TT |
| 2,809,116 | 10/1957 | Laskowski | 23/230 |
| 3,404,962 | 10/1968 | Medlar et al. | 23/253 |

Primary Examiner—Morris O. Wolk
Assistant Examiner—R. E. Serwin

[57] ABSTRACT

Means whereby it becomes practical and at low cost to determined whether a frozen product has thawed prior to reaching the ultimate user. By the use of an Indicator Means consisting of liquid in a frozen state that forms a layer or layers separating two activating components, a solute electrolyte and a pH-sensitive indicator, that remain inactive as long as the layer or layers are in a frozen state. Upon the melting of the frozen layer or layers, the two activating components become activated in the formed single liquid. The thawing of the frozen product causes the melting of the frozen layer or layers of the Indicator Means thereby triggering an identifying color in the Indicator Means. The identifying color is sharp, distinct and irreversible remaining after the thawed package may be re-frozen providing the ultimate user with a check for pre-thawing since the Indicator Means could be permanently attached to or visibly inserted into each individual package or a number of the indicators could be placed in a carton containing a plurality of frozen packages before the carton is sealed.

9 Claims, 6 Drawing Figures

PATENTED FEB 12 1974 3,791,794
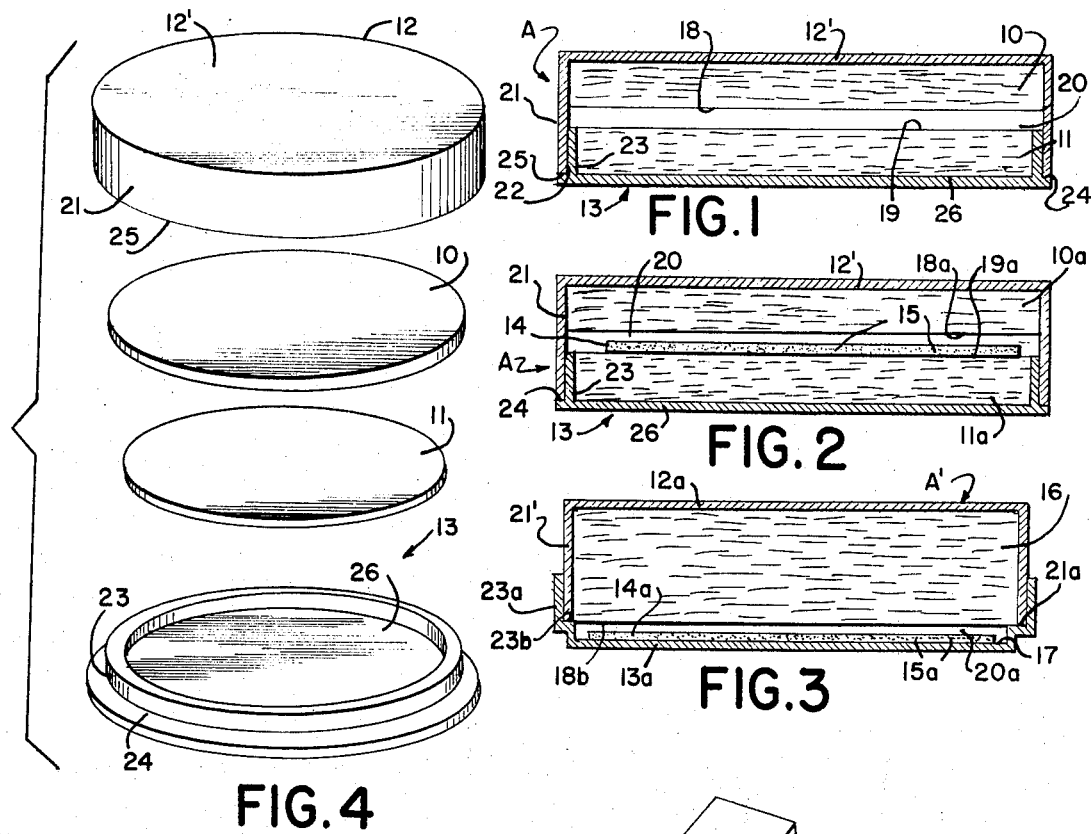
FIG. 1
FIG. 2
FIG. 3
FIG. 4
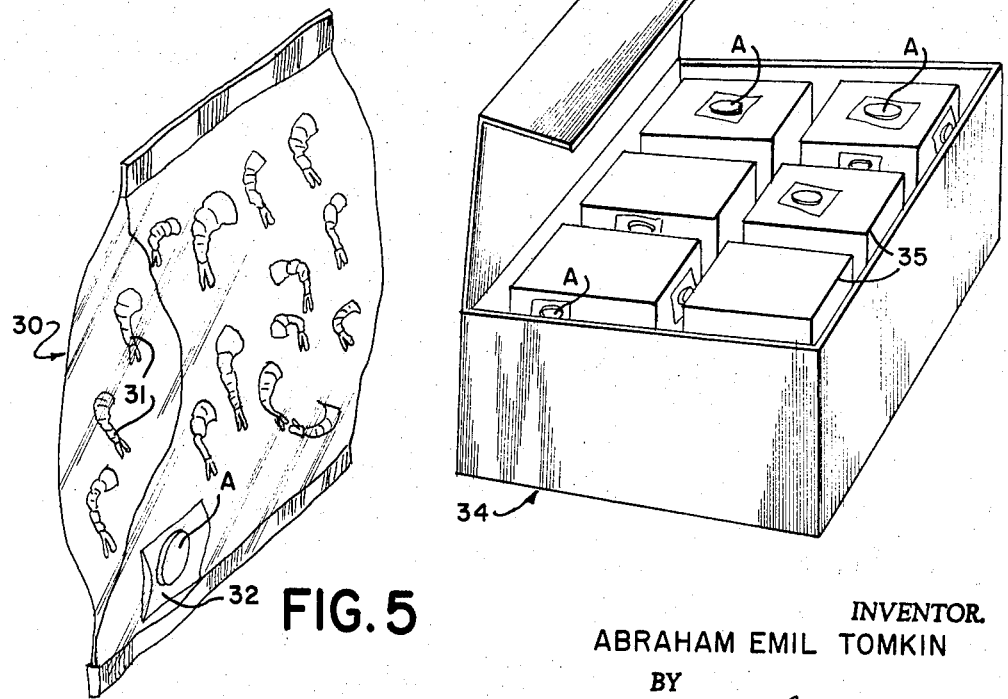
FIG. 5
FIG. 6
INVENTOR.
ABRAHAM EMIL TOMKIN
BY
John A. Mawhinney
ATTORNEY

INDICATOR MEANS IN FROZEN STATE UTILIZING pH-SENSITIVE INDICATOR AND SEPARATED ELECTROLYTE

This invention relates to means for checking frozen products as foodstuffs, medicinals and similar frozen material to determine any pre-thawing of such products prior to reaching the ultimate user. The means of this invention incorporate the use of liquid in a frozen state that forms a layer or layers separating two activating components, a solute electrolyte and a pH-sensitive indicator, that remain inactive as long as the layer or layers are in a frozen state. The thawing of the frozen product causes the melting of the frozen layer or layers thereby triggering a color change in the Indicator Means.

Under existing conditions of marketing and distribution of frozen products, the ultimate user is not being provided with the means to ascertain whether the frozen package was allowed to thaw even though it may be in a frozen condition at the time the user obtains same. This knowledge is essential especially with rapidly perishable items as meat, poultry and seafood. The thawing of such frozen products in transit or otherwise can make such thawed products hazardous for consumption. With other items as fruits, juices and vegetables, the thawed products may produce undesirable properties in taste and keeping qualities. Re-freezing of the thawed products at intermediate distribution points prior to sales to user is an undesirable practice.

Various means to arrive at a check on thawing of frozen products have been introduced. These means encompassed such ways as blending of different colored liquids on thawing, inserts into the depth of frozen packages to draw an indication on thawing, changing the color of the entire frozen product itself when thawed and similar. Either on account of high costs or utilization limitations, such means have not been found practical for use.

The problem is to readily identify each package that was subjected to pre-thawing, inexpensively and by practical means. This invention provides practical means and at realistic low cost. The user is interested in the specific package that is purchased. This invention permits the user to check any package before purchase to determine whether that package was allowed to thaw at any time after it was originally frozen in production.

This invention covers means whereby liquid in a frozen state forms a layer or layers that separate two activating components. The two activating components remain inactive as long as the separating layer or layers are in a frozen state. When the frozen layer or layers are melted in the thawing of the frozen product, the two components are activated effecting a distinct and identifying color in the single liquid formed in the melting of the frozen layer or layers. This invention therefore provides means whereby it becomes practical to determine whether a frozen product has been subjected to thawing prior to reaching the user. The thawing of the frozen product triggers a color change in the Indicator Means. This color change is automatic and irreversible. The identifying color is sharp and distinct remaining after the thawed package may be re-frozen. The means of this invention may be incorporated into a flat clear container that may be securely attached to or visible surface-inserted into each individual package providing the user a ready means to check the purchase.

While this invention is primarily intended for use with frozen foodstuffs and medicinals, it is not the intent for limiting to these uses. Also, applications for determining environmental changes will fall within the intent for the use of the means of this invention where special instrumentation may not be available.

FIG. 1 is a cross-section of one form of the means of this invention.

FIG. 2 is a cross-section of a second form of the means of this invention.

FIG. 3 is a cross-section of a third form of the means of this invention.

FIG. 4 is an exploded perspective view of the form of the invention shown in FIG. 1.

FIG. 5 is a perspective view of a frozen package showing the indicator means applied to the exterior of the frozen package, and FIG. 6 is a perspective view of a carton of frozen packages showing a plurality of the indicator means placed at random in the carton before the carton is sealed.

The figures shown are illustrative of some forms of the means of this invention but are intended not to be limiting.

The Indicator Means shown in FIG. 1 consists essentially of two activating components: a solute electrolyte component dissolved in a liquid brought to a frozen state forming layer 10, and a pH-sensitive indicator component dissolved or dispersed in a liquid brought to a frozen state forming layer 11. The said two frozen layers 10 and 11 are contained for example in a clear round flat container generally indicated at A.

The container A comprises an upper member 12 having a closed upper end 12' and a depending annular skirt 21 and is open at the lower end thereof as indicated at 22 which open end has fitted therein a cover generally indicated at 13 for closing the open end 22 of the member 12. The container A, including the member 12 and cover 13 may be made of plastic or other suitable material. Cover 13 may be inside fitted, as shown in FIG. 1, into upper member 12 air tight and water tight. For this purpose the cover 13 has an upstanding annular flange 23 the outside diameter of which is substantially the same as the inside diameter of the skirt 21 on the member 12 so that there is provided said air tight and water tight seal between the two parts. The outside diameter of the flange 23 is less than that of the cover 13 to provide an upwardly facing shoulder 24 which abuts the lower edge 25 of the member 12 to form an air and water tight seal therebetween. The cover 13 has a closed bottom 26.

The said solute electrolyte component is dissolved into liquid and frozen into layer 10 which is frozen and fixed to the innerface of the upper closed end 12' of member 12. The said pH-sensitive indicator component is dissolved or dispersed in a finely divided form in a liquid which liquid is frozen into layer 11. Layer 11 is frozen and fixed to the inner face of the bottoms 26 of the cover 13. The inside of cover 13 is of sufficient depth to form a suitable layer 11. Layer 10 and layer 11 may be of the same thickness but of less combined thickness than the inside height of the container A so that a space 20 separates frozen layer 10 from frozen layer 11 with facing surfaces 18 and 19 respectively. The overall dimensions of container A with fitted cover 13 may be approximately 1-inch in diameter and one-fourth-inch in depth for small packages of frozen products but the size and form would vary according to particular needs.

EXAMPLE 1 FOR FIG. 1

The liquid for layer 10 in example 1 may be water. The said solute electrolyte component in example 1 may be an alkali compound as sodium hydroxide. The solute electrolyte component may be any suitable compound soluble in said liquid of layer 10 disassociating ionically in said liquid to provide the proper pH value to activate a color change for said pH-sensitive indicator component. The said pH-sensitive indicator component of layer 11 in the instance of example 1 may be an indicator as thymolphthalein. Since thymolphthalein is insoluble in water and where water is the liquid for layer 11, the thymolphthalein will be dispersed in layer 11 when layer 11 is in a frozen state. Where the thymolphthalein is dissolved in the liquid for layer 11, the liquid may be an aqueous alcoholic solution.

As long as the package of frozen product to which the Indicator Means is attached or in which it is visibly inserted remains in a frozen condition, the Indicator Means shows no color change. Assuming the Indicator Means is in such position where layer 10 is above layer 11, then when the package of frozen product is thawed to a temperature to melt layer 10, the melted layer 10 will drop to the position of layer 11. Layer 11 in turn will also be melting. The formed liquid of layer 10 which in the instance of example 1 is an aqueous solution of sodium hydroxide will combine with the formed liquid of layer 11 which may be either in the instance of example 1 an aqueous alcoholic solution of thymolphthalein or a dispersion of thymolphthalein in water. The said sodium hydroxide solution has a pH value in the range of 10 sufficient to react with the dissolved thymolphthalein indicator or to bring the dispersed thymolphthalein indicator into solution and effect a color change in the combined liquid formed in the melting of layers 10 and 11. The color change in the said combined liquid is from colorless to deep blue. The color change is irreversible should the thawed package of the frozen product be re-frozen. With the position of the Indicator Means reversed as to the relative positions of layer 10 and 11, the color change will be effected in a manner similar to that described above.

EXAMPLE 2 FOR FIG. 1

In the example 2, the said solute electrolyte component of layer 10 may be an acid salt compound or an acid dissolved in water. The acid salt compound may be sodium bisulfate or may be an acid as sulfuric acid as the said solute electrolyte component. The said pH-sensitive indicator component of layer 11 may be methyl orange dissolved in water. The sodium bisulfate solution or the sulfuric acid solution produces a pH value in the range below 4. Using the methyl orange indicator, the color change of the formed combined liquid of melted layers 10 and 11 would be from yellow to pink-red.

The Indicator Means shown in FIG. 2 is similar to FIG. 1 except as follows: Layer 11a corresponds to layer 11 of FIG. 1 except that the liquid layer 11a may not contain the said pH-sensitive indicator component. Layer 10a corresponds to layer 10 of FIG. 1 except that the liquid layer 10a may not contain the said electrolyte component. A layer 14 is included. Layer 14 is located in spacing 20 and is of a degree of thickness providing sufficient spacing from either surface 18a of layer 10a or surface 19a of layer 11a. Spacing 20 corresponds to spacing 20 of FIG. 1. The material of layer 14 is insoluble in frozen layers 10a and 11a and soluble in melted layers 10a and 11a; and may be of a material as gum arabic. There is dispersed in finely divided form in layer 14 an activating component 15 which may be either the said pH-sensitive indicator component of FIG. 1 or the said solute electrolyte component of FIG. 1, as the case may be.

EXAMPLE 3 FOR FIG. 2

In the example 3, layer 10a may be an aqueous solution of sodium hydroxide as the said solute electrolyte component. Layer 11a may be water without said pH-sensitive indicator component. Activating component 15 dispersed in layer 14 may be thymolphthalein indicator as the said pH-sensitive indicator component. The color change is effected in the melting of layers 10a and 11a in the manner described in FIG. 1. The color change in the formed combined liquid would be from colorless to deep blue.

EXAMPLE 4 FOR FIG. 2

In the example 4, layer 10a may be water without said solute electrolyte component. Layer 11a may be either an aqueous alcoholic solution of thymolphthalein or may be thymolphthalein in finely divided form dispersed in water as the said pH-sensitive indicator component. Activating component 15 dispersed in layer 14 may be sodium hydroxide as the said solute electrolyte component. The color change is effected in the melting of layers 10a and 11a in the manner described for FIG. 1. The color change in the formed combined liquid would be from colorless to deep blue.

EXAMPLE 5 FOR FIG. 2

In the example 5, the said solute electrolyte component of layer 10a may be an acid salt compound or acid dissolved in water. The acid salt compound may be sodium bisulfate or may be an acid as sulfuric acid as the said solute electrolyte component. Layer 11a may be water without said pH-sensitive indicator component. Activating component 15 dispersed in layer 14 may be methyl orange indicator as the said pH-sensitive indicator component. The color change is effected in the melting of layers 10a and 11a in the manner described for FIG. 1. The color change in the formed combined liquid would be from colorless to pink-red.

EXAMPLE 6 FOR FIG. 2

In the example 6, layer 10a may be water without said solute electrolyte component. Layer 11a may be an aqueous solution of methyl orange as the said pH-sensitive indicator component. Activating component 15 dispersed in layer 14 may be sodium bisulfate as the said solute electrolyte component. The color change is effected in the melting of layers 10a and 11a in the manner described for FIG. 1. The color change in the formed combined liquid would be from yellow to pink-red.

The Indicator Means shown in FIG. 3 is similar to that shown in FIG. 1 except as follows: Layer 16 corresponds to either layer 10 of FIG. 1 or to layer 11 of FIG. 1 as the case may be. Layer 14a corresponds to layer 14 (FIG. 2) except that layer 14a may be thinner than layer 14 with the thickness of layer 14a sufficiently limited to only hold and fix the activating component 15a to inside surface 17 of cover 13a. The layer 14a may be mounted or formed on a clear plate (not shown) as plastic for added weight to provide free movement in spacing well 20a. Layer 14a is spaced from surface 18b of layer 16. Activating component 15a dispersed in layer 14a may be either the said solute electrolyte component of layer 10 of FIG. 1 or the said pH-sensitive indicator component of layer 11 of FIG. 1 as the case may be. Container A' corresponds to container A of FIG. 1. Cover 13a corresponds to cover 13 of FIG. 1 except that flange 23a of cover 13a may be fitted over outside of skirt 21' of the upper member 12a of the container A'. The flange 23a has an upwardly facing annular shoulder 23b which engages the lower end face 21a of the skirt 21' to provide the well 20a. Well 20a corresponds to spacing 20 of FIG. 1. Surface 18b is the surface of frozen layer 16 facing layer 14a. An additional cover like 13a (not shown) with an additional layer like 14a may be added to a container A' having openings at both ends. This additional cover would permit the Indicator Means shown in FIG. 3 to be used in any position where layer 14a may be fixed to inside surface 17 of cover 13a.

EXAMPLE 7 OF FIG. 3

In the example 7, layer 16 may be an aqueous solution of sodium hydroxide as said solute electrolyte component. Layer 16 corresponds to layer 10 of FIG. 1 except that layer 16 may be thicker. Layer 11 of FIG. 1 has been eliminated. Activating component 15a dispersed in layer 14a may be thymolphthalein as the pH-sensitive indicator component. The color change is effected in the melting of layer 16 in the manner described for FIG. 1. The color change in the formed liquid would be from colorless to deep blue.

EXAMPLE 8 FOR FIG. 3

In the example 8, layer 16 may be an aqueous alcoholic solution of thymolphthalein or a dispersion of finely divided thymolphthalein in water as the said pH-sensitive indicator component. Layer 16 corresponds to layer 11 of FIG. 1 except that layer 16 may be thicker. Layer 10 of FIG. 1 has been eliminated. Activating component 15a dispersed in layer 14a may be finely divided sodium hydroxide as said solute electrolyte component. The color change is effected in the melting of layer 16 in the manner described for FIG. 1. The color change in the formed liquid would be from colorless to deep blue.

EXAMPLE 9 FOR FIG. 3

In the example 9, layer 16 may be an aqueous solution of an acid as sulfuric acid or of an acid salt compound as sodium bisulfate as the said solute electrolyte component. Layer 16 corresponds to layer 10 of FIG. 1 except that layer 16 may be thicker. Layer 11 of FIG. 1 has been eliminated. Activating component 15a dispersed in layer 14a may be finely divided methyl orange indicator as said pH-sensitive indicator component. The color change is effected in the melting of layer 16 in the manner described for FIG. 1. The color change in the formed liquid would be from colorless to pink-red.

EXAMPLE 10 FOR FIG. 3

In the example 10, layer 16 may be an aqueous methyl orange solution as the said pH-sensitive indicator component. Layer 16 corresponds to layer 11 of FIG. 1 except layer 16 may be thicker. Layer 10 of FIG. 1 has been eliminated. Activating component 15a dispersed in layer 14a may be finely divided sodium bisulfate as said solute electrolyte component. The color change is effected in the melting of layer 16 in the manner described for FIG. 1. The color change in the formed liquid would be from yellow to pink-red.

FIG. 5 of the drawings shows a package 30 of plastic or the like containing a product such as frozen shrimp 31. A container A including the indicator means is secured to the exterior of the package 30 by a clear colorless plastic cover 32 with a suitable adhesive or container A may be visibly inserted into a formed pocket (not shown) on the surface of package 30 as an alternate to the clear colorless plastic cover 32. If the package becomes thawed the indicator means will show a distinct color change readily observable by the purchaser. This color change will be permanent and irreversible should the thawed content 31 of the package 30 be re-frozen providing a visible warning to the potential purchaser that the content 31 of package 30 has been thawed after it was originally frozen by the food processor.

FIG. 6 illustrates a carton 34 containing a number of packages 35 of frozen goods on which containers A have been placed or secured as shown in FIG. 5 of the drawing. The carton 34 is then sealed closed with the frozen packages 35 and the indicator means A enclosed therein. When the receiver of the goods such as for a restaurant or a hospital opens the carton 34, an inspection of the indicator means A will indicate to him whether or not the goods have been thawed and refrozen.

Applicant is familiar with U.S. Pat. No. 3,122,921 granted Mar. 3, 1964 to Robert B. Koch and assigned to Minneapolis-Honeywell Regulator Company, Minneapolis, Minnesota, entitled Condition Responsive Device. However, this patent discloses the physical reaction in blending two gels of different colors, whereas, the present invention teaches a chemical reaction between a solute electrolyte component and a pH-sensitive indicator component.

The figures and examples shown are intended to illustrate functioning characteristics of the means of this invention. The forms, dimensions and material components are not intended to be limiting except by the claims set forth.

What I claim is:

1. Indicator means consisting essentially of a solute electrolyte component and a pH-sensitive indicator component, said two components encased in a sealed container, said solute electrolyte component dissolved ionically in a liquid with said formed solution of said solute electrolyte component then brought to a frozen state, said ionized solution of said electrolyte component in a frozen state forming a layer fixed to one end of said encasement container, said pH-sensitive indicator component dissolved or dispersed in a liquid with said formed solution or dispersion of said pH-sensitive indicator component then brought to a frozen state, said solution or dispersion of said pH-sensitive indicator component in a frozen state forming a layer fixed to opposite end of said encasement container, said frozen layers spaced out of direct surface contact with each other, said ionized solution of said electrolyte component when melted from its frozen state forming a single combined liquid with said solution or dispersion of said pH-sensitive indicator component when melted from its frozen state, said ionized solution of said electrolyte component in melted state having a pH value reactive with said solution or dispersion of said pH-sensitive indicator component in melted state effecting a distinct color change in said formed combined liquid, said color change in said formed combined liquid being permanent and irreversible on re-freezing of said indicator means.

2. Indicator means in accordance with claim 1 where one of said frozen layers does not contain said pH-sensitive indicator component, said pH-sensitive indicator component being dispersed in finely divided form in a layer of material, said layer of material being soluble in said frozen layers when said frozen layers are melted, said layer of material with dispersion of said pH-sensitive indicator component located in said spacing between said frozen layers and spaced out of direct surface contact from said frozen layer of said solute electrolyte component.

3. Indicator means in accordance with claim 1 where one of said frozen layers does not contain said solute electrolyte component, said solute electrolyte component being dispersed in finely divided form in a layer of material, said layer of material being soluble in said frozen layers when said frozen layers are melted, said layer of material with dispersed said solute electrolyte component located in said spacing between said frozen layers and spaced out of direct surface contact from said frozen layer of said pH-sensitive indicator component.

4. Indicator means in accordance with claim 1 where said frozen layer of said pH-sensitive indicator component is eliminated, said pH-sensitive indicator being dispersed in finely divided form in a layer of material, said layer of material being soluble in said frozen layer of said soluble electrolyte component when said frozen layer of said solute electrolyte component is melted, said layer of material with dispersed pH-sensitive indicator component being spaced out of direct surface contact from said frozen layer of said solute electrolyte component.

5. Indicator means in accordance with claim 1 where said frozen layer of said solute electrolyte component is eliminated, said solute electrolyte component being dispersed in finely divided form in a layer of material, said layer of material being soluble in said frozen layer of said pH-sensitive indicator component when said frozen layer of said pH-sensitive indicator component is melted, said layer of material with dispersed said solute electrolyte component being spaced out of direct surface contact from said frozen layer of said pH-sensitive indicator component.

6. Indicator means in accordance with claim 1 where said solute electrolyte component is an alkali compound.

7. Indicator means in accordance with claim 1 where said solute electrolyte component is an acid salt or in the form of an acid.

8. Indicator means in accordance with claim 1 where said components are completely encased in a clear colorless non-reactive flat container sealed air tight and water tight.

9. For use with a package of frozen product, an indicator means adapted to be affixed to or visibly inserted into the exterior surface of the frozen package, comprising two members in frozen condition disposed within said container in spaced apart relation, one of said members containing a pH-sensitive indicator component, the other member containing a solute electrolyte component, said components characterized by the fact that when the two members are melted from the frozen state they form a single liquid effecting a distinct color change from the color when the members are in their spaced apart frozen state and that said color change in the formed single liquid is permanent and irreversible on re-freezing of said indicator means.

* * * * *